Patented Feb. 16, 1937

2,070,997

UNITED STATES PATENT OFFICE 2,070,997

AZO DYESTUFFS

Emil Eduard Misslin, Basel, and Rudolf von Capeller, Riehen, Switzerland, assignors to the firm of Society of Chemical Industry in Basle, Basel, Switzerland No Drawing. Application September 25, 1935, Serial No. 42,144. In Switzerland September 29, 1934

10 Claims.  (Cl. 260—72)

It has been found that new and valuable azo-dyestuffs are obtained by uniting with diazo-compounds the new hydroxy-naphthalene-sulfonic acids themselves obtainable by acylating the two amino-groups of the heteronuclear 1,3-diamino-hydroxynaphthalene-sulfonic acids (cf. German Patent No. 92,239). According to the nature of the acylating agents, the heteronuclear 1,3-diamino-hydroxynaphthalene-sulfonic acid, and the diazo-compound used there are obtained acid wool dyestuffs, dyestuffs for lacquers, or also direct dyeing dyestuffs. By the expression heteronuclear 1,3-diamino-hydroxynaphthalene-sulfonic acids there are understood such compounds which contain OH and $SO_3H$ groups in that six membered ring of the naphthalene nucleus which does not contain the two $NH_2$-groups.

Valuable dyestuffs are particularly obtained from the 1,3-diamino-8-hydroxynaphthalene-6-sulfonic acid and the 1,3-diamino-5-hydroxynaphthalene-8-sulfonic acid. These dyestuffs are obtained by uniting diazo-compounds of the general formula

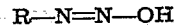

(R meaning any desired radical of the benzene or naphthalene series) with the hydroxynaphthalene-sulfonic acids of the general formula

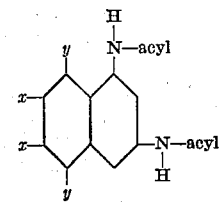

wherein one $y$ stands for an OH-group and the other $y$ for a hydrogen atom, one $x$ stands for a $SO_3H$-group and the other $x$ for a hydrogen atom, and wherein further a hydrogen atom lies between the OH-group and the $SO_3H$-group, whereby there are obtained dyestuffs of the general formula

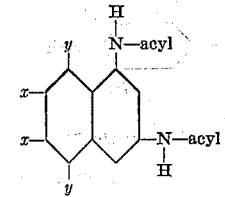

in which one $y$ stands for an OH-group and the other $y$ for a hydrogen atom, one $x$ stands for a $SO_3H$-group and the other $x$ for a —N=N—R-group wherein R means any desired aromatic radical of the benzene or naphthalene series and in which the —N=N—R-group stands in o-position to the OH-group, which products are more or less dark powders, dissolving in water to red, to violet, to blue and green solutions, and dyeing the fiber similar tints. In the present specification the expression "fiber" comprises both animal fibers and vegetable fibers or fibers from regenerated cellulose.

When starting for example from hydroxynaphthalene-sulfonic acids of the above cited general formula, wherein acyl stands for radicals of aliphatic carboxylic acids (such as formyl, acetyl, chloracetyl or propionyl radicals), and combining the same with ortho-hydroxylated or ortho-carboxylated diazo-compounds, there are produced dyestuffs which can be converted into metalliferous dyestuffs which may be used for dyeing wool by further treatment in substance or on the fiber with agents yielding metal. Particularly valuable dyestuffs are obtained when using the new intermediate products themselves obtainable by aroylating 1,3-diamino-8-hydroxy-naphthalene-6-sulfonic acid, for example, with benzoyl chloride, meta- or para-nitrobenzoyl chloride, α- or β-naphthoyl chloride, those dyestuffs being of special value which are produced with aroylating agents containing nitro-groups, and by reducing the condensation products thus obtained and containing the nitro-groups. These products are particularly valuable both as coupling components for the manufacture of dyestuffs capable of being diazotized on the fiber, and as diazotizing components.

It must be noted that the dyestuffs of this invention are also obtainable by combining the non-acylated heteronuclear 1,3 - diamino - hydroxy-naphthalene-sulfonic acids first with a diazo-compound under such conditions that the OH-group only is of importance for the formation of the azo-dyestuff, and then treating the dyestuff thus obtained with a suitable acylating agent and, if desired, subjecting this product to a cautious saponification or reduction.

The following examples illustrate the invention, the parts being by weight:—

Example 1

66 parts of 1,3-diamino-8-hydroxy-naphthalene-6-sulfonic acid are suspended in water and cautiously neutralized with anhydrous sodium carbonate. There is then added to the mixture carefully, drop by drop, 35 parts of acetic anhydride, while at the same time sufficient sodium hydroxide solution is added to maintain the mutual reaction of the solution as closely as possible.

The solution of the diacylated 1,3-diamino-8-hydroxy-naphthalene-6-sulfonic acid thus obtained may be used immediately for the manufacture of azo-dyestuffs. If it is coupled, for example, with the equivalent quantity of a diazo-benzene solution buffered with sodium acetate, there is obtained an azo-dyestuff of the formula

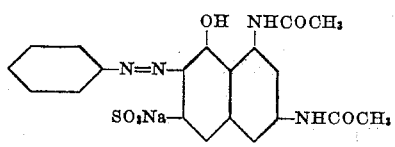

which dyes wool bright red. A cotton dyestuff is obtained with dehydrothiotoluidine.

In like manner 1,3-diamino-5-hydroxy-naphthalene-7-sulfonic acid may be used in the process.

Products of like properties are produced by treating 1,3-diamino-8-hydroxynaphthalene-6-sulfonic acid with benzoyl chloride. Thus the azo-dyestuff of the formula

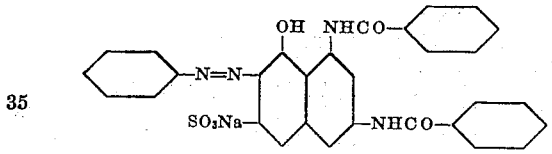

made from 1,3-dibenzoyl-diamino-8-hydroxy-naphthalene-7-sulfonic acid and diazo-benzene dyes wool in an acid bath pure bluish-red. When substituting the para-toluenesulfochloride for the benzoyl chloride there is also obtained an intermediate product which also leads to wool dyestuffs with simple diazo compounds, such as diazo-benzene-sulfonic acid, diazo-toluene-sulfonic acid or diazo-naphthalene-sulfonic acid.

Example 2

60 parts of 1,3-diamino-8-hydroxy-naphthalene-6-sulfonic acid are suspended in 1000 parts of water heated to 50–60° C. and are cautiously neutralized with anhydrous sodium carbonate. There are then added 50 parts of calcium carbonate and 94 parts of meta-nitrobenzoylchloride, introduced in small portions. The calcium salt of the 3′,3′′-dinitro-benzoyl-1,3-diamino-8-hydroxynaphthalene-6-sulfonic acid separates and, when cool, is filtered. This calcium salt is stirred into 2000 parts of hot water and converted, by means of anhydrous sodium carbonate, into the soluble sodium salt of the same acid. The whole is filtered hot, allowed to cool and from it the sodium salt of the 3′,3′′-dinitro-dibenzoyl-1,3-diamino-8-hydroxynaphthalene-6-sulfonic acid is salted out by addition of sodium chloride.

For the reduction 115 parts of this sodium salt are dissolved in about 2000 parts of hot water. The solution is allowed to run gradually into a reducing mixture, boiling under reflux and well stirred, of 1000 parts of water, 300 parts of iron turnings and 30 parts of acetic acid. When the whole has been run in, the mixture is boiled for another half-an-hour under reflux, anhydrous sodium carbonate is added until all the iron has been precipitated and the whole is filtered hot from ferruginous mud. The filtrate is acidified with acetic acid and the 3′,3′′-diamino-dibenzoyl-1,3-diamino-8-hydroxy-naphthalene-6-sulfonic acid is salted out.

The procedure is similar when para-nitro-benzoyl-chloride is used instead of meta-nitrobenzoylchloride. These new intermediate products, when coupled with diazo-compounds, yield dyestuffs which are characterized by high affinity to cellulose or regenerated cellulose. Thus the aniline or ortho-toluidine-dyestuffs dye cotton blue-red tints which can be diazotized on the fibre and further developed. With beta-naphthol extraordinarily strong yellowish-red dyeings are obtained.

If the amino-aroylated compounds are acylated there are obtained products which already have substantive character. They can, therefore, be converted into dyestuffs on the fibre. The dyestuff from ortho-diazotoluene and meta′,meta′′-diacetyl-amino-dibenzoyl-1,3-diamino-8-hydroxy-naphthalene-6-sulfonic acid of the formula

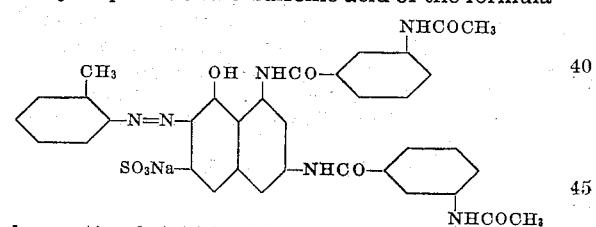

dyes cotton bright bluish-red tints.

Dyestuffs can also be made by tetrazotizing the new coupling components and coupling with suitable diazo-compounds. For example, the reduced condensation product from 1 mol. 1,3-diamino-8-hydroxynaphthalene-6-sulfonic acid and 2 mols nitrotoluic acid chloride (CH₃:NO₂:COCl=1:2:4) and meta-toluylene-diamine yields a dyestuff dyeing cotton yellow which by further development on the fibre with diazotized para-nitraniline yields an intense brown. The dyestuff corresponds very probably with the formula

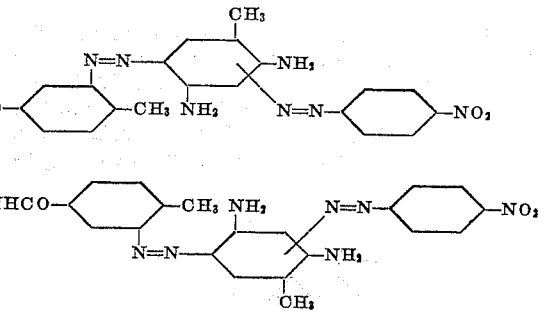

Example 3

23.7 parts of the para-toluenesulfonic acid ester of 1-amino-8-hydroxynaphthalene-3,6-disulfonic acid of the formula

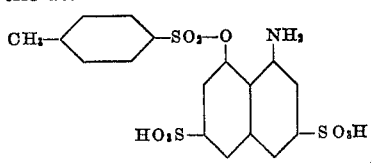

are dissolved in 600 parts of water and the solution is cooled to 0° C. There are then added 12 parts of hydrochloric acid of 30 per cent. strength, and while well stirring 17.5 parts of a sodium nitrite solution of 20 per cent. strength is caused to flow into the liquid beneath its surface. When diazotization is complete 7.2 parts of α-naphthylamine, dissolved in the form of hydrochloride are added. The coupling proceeds very well without further addition and stirring is continued overnight. After addition of 8 parts of anhydrous sodium carbonate and 40 parts of a sodium hydroxide solution of 40 per cent. strength the monoazo-dyestuff produced is dissolved, 17.5 parts of a sodium nitrite solution of 20 per cent. strength are added at 0-5° C. and indirect diazotizing is produced by adding in a single dose, while stirring well, 30 parts of hydrochloric acid of 30 per cent. strength. Stirring is continued for 2 hours at 10-15° C. The separated diazo-compound is filtered and suspended in 1000 parts of ice-water. This diazo-compound of the monoazo-dyestuff is run into a cold solution of 24.6 parts of 4',4"-diamino-dibenzoyl-1,3-diamino-8-hydroxy-naphthalene-6-sulfonic acid and 15 parts of anhydrous sodium carbonate in 500 parts of water and the whole is stirred for some hours. When coupling is complete the disazo-dyestuff is salted out, filtered and stirred into 500 parts of sodium hydroxide solution of 2 per cent. strength. For saponifying the toluene sulfo-ester the whole is heated for about ¼ hour at 60-70° C., neutralized with acetic acid and the precipitated disazo-dyestuff filtered.

The dyestuff thus obtained of the formula

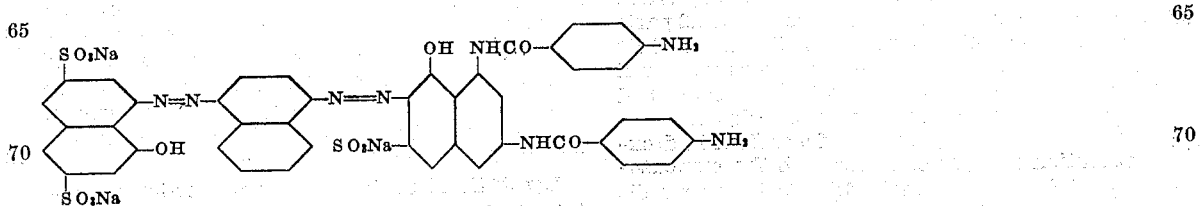

dissolves in water to a blue solution and dyes cotton blue tints which when diazotized and coupled with phenoylmethyl-pyrazolone become green, fast to washing.

Similar dyestuffs are produced when, instead of α-naphthylamine, another middle component is used for instance cresidine or 1-amino-2-methoxy-naphthalene. The dyestuff produced with cresidine as middle component corresponds to the formula

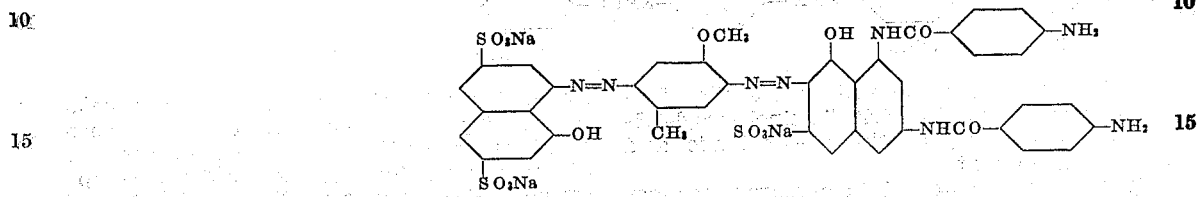

Also instead of 4',4"-diamino-dibenzoyl-1,3-diamino-8-hydroxy-naphthalene - 6 - sulfonic acid the reduced condensation product from 1,3-diamino - 8 - hydroxynaphthalene-6-sulfonic acid and meta-nitro-benzoyl-chloride or the nitro-toluic acid chloride named in the foregoing example may be used.

*Example 4*

30.3 parts of β-naphthylamine-4,8-disulfonic acid are diazotized in the usual manner, coupled with α-naphthylamine, further diazotized and the diazo-compound of this monoazo-dyestuff, if necessary, salted out and isolated by filtration. It is suspended in about 400 parts of water and the suspension is run into a cold solution of 50 parts of 3',3"-diamino - dibenzoyl-1,3-diamino-8-hydroxy-naphthalene-6-sulfonic acid in about 500 parts of water, and 35 parts of anhydrous sodium carbonate. When coupling is complete the whole is heated to 70-80° C. and the precipitated dyestuff is filtered hot.

This dyestuff of the formula

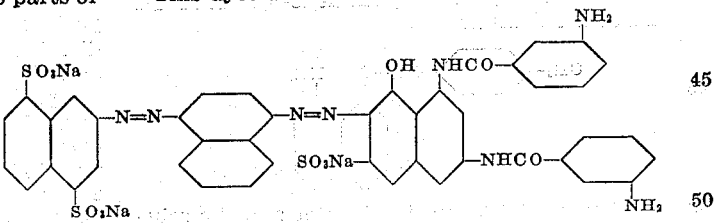

dissolves in water to a blue solution and dyes cotton blue tints which by diazotization and coupling with phenylmethyl - pyrazolone become green and fast to washing.

In this case also instead of the middle component named, other middle components may be used, for instance cresidine or para-xylidine or even 1-amino-2-methoxynaphthalene; as the initial component various aromatic sulfonic acids of the benzene or naphthalene series can be used. Thus, for example, the dyestuff from 1-amino-2,5-dichlorobenzene-4-sulfonic acid as initial component and 1-amino-2-methoxynaphthalene- 6-sulfonic acid as middle component corresponds to the formula

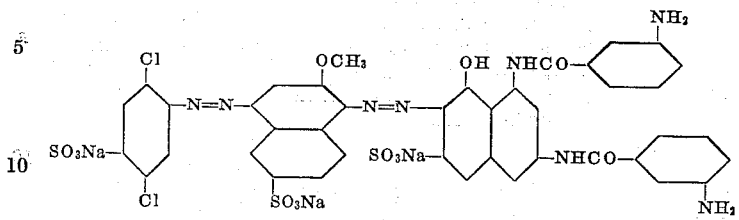

Also here there are obtained quite similar dyestuffs when using the 4,4'-diaminobenzoyl-1,3-diamino - 8-hydroxynaphthalene-6-sulfonic acid as final component.

The dyestuffs obtained in analogous manner from the 4,4'-diaminobenzoyl- or 3,3'-diaminobenzoyl-1,3-diamino - 5 - hydroxynaphthalene-7-sulfonic acid have very similar properties.

Thus the dyestuff of the formula

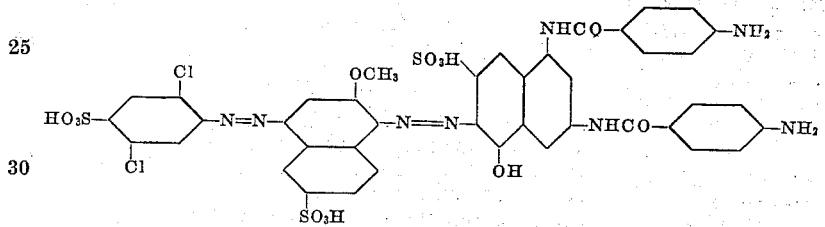

represents a dark powder which dissolves in water to blue solutions, dyes cotton similar tints, and, when diazotized on the fiber and developed with 1-phenyl-3-methyl-5-pyrazolone, dyes the same fast green tints.

*Example 5*

23.7 parts of para-toluenesulfonic acid ester of 1-amino - 8 - hydroxynaphthalene-3,6-disulfonic acid of the formula

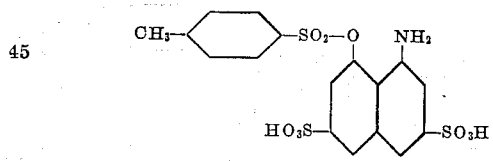

are dissolved in 600 parts of water and the solution is cooled to 0° C. There are then added 12 parts of hydrochloric acid of 30 per cent. strength and, while stirring well, 17.5 parts of a solution of 20 per cent. strength of sodium nitrite introduced beneath the surface of the liquid. When diazotization is complete there are added 7.2 parts of α-naphthylamine dissolved in the form of its hydrochloride. The coupling proceeds very well without further addition and stirring is continued overnight. By adding 8 parts of anhydrous sodium carbonate and 40 parts of a sodium hydroxide solution of 4 per cent. strength the monoazo-dyestuff formed is dissolved; it is indirectly diazotized by addition of a sodium nitrite solution of 20 per cent. strength and addition, in one dose at 0–5° C., of 30 parts of hydrochloric acid of 30 per cent. strength, while stirring well. After a further 2 hours stirring at 10–15° C. the precipitated diazo-compound is filtered and suspended in 1000 parts of ice-water. Into this suspension is run a solution of 11.2 parts of a mixture of 1-naphthylamine-6-sulfonic acid and 1-naphthylamine-7-sulfonic acid, dissolved in 200 parts of water in the form of sodium salts; buffering with sodium acetate and stirring overnight follow. The disazo-dyestuff thus formed is salted out, is filtered and suspended in ice-water. To the suspension is added sufficient sodium hydroxide solution to dissolve the disazo-dyestuff and the whole is diazotized indirectly with the calculated quantity of sodium nitrite and hydrochloric acid. After about 2 hours, the diazotization being at an end, the diazo-compound is salted out, filtered and well suspended in ice-water. The suspension is run into a cold solution of 24.6 parts of 3',3''- or 4',4''-diamino-dibenzoyl-1,3-diamino-8-hydroxynaphthalene - 6-sulfonic acid and 15 parts of anhydrous sodium carbonate in 500 parts of water and the mixture is stirred for some hours. When coupling is complete the trisazo-dyestuff is salted out, filtered and stirred into 500 parts of sodium hydroxide solution of 2 per cent. strength; for saponification of the toluene-sulfoester the mixture is warmed for about ¼ hour at 60–70° C.; neutralized with acetic acid and filtered to separate the saponified trisazo-dyestuff of the general formula

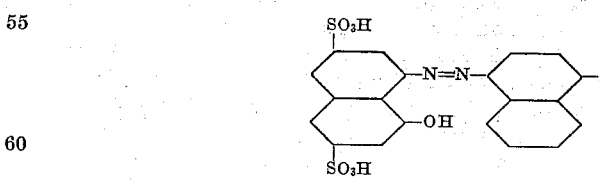 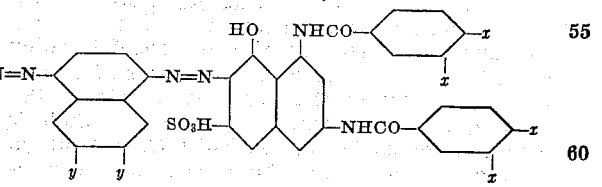

in which one $y$ stands for a $SO_3H$-group and the other $y$ for a hydrogen atom, and in which in each of the benzene nuclei one $x$ stands for an amino-group and the other $x$ for a hydrogen atom. It forms a dark powder which dissolves in water to a blue solution and dyes cotton blue tints which, when diazotized and developed with phenylmethylpyrazolone, become green and fast.

Dyestuffs of similar dyeing properties are obtained when one of the initial components named in Example 4 is substituted for the 1,8-aminonaphthol derivative used in this example and when other middle components are used. Thus, the azo-dyestuffs of the formulas

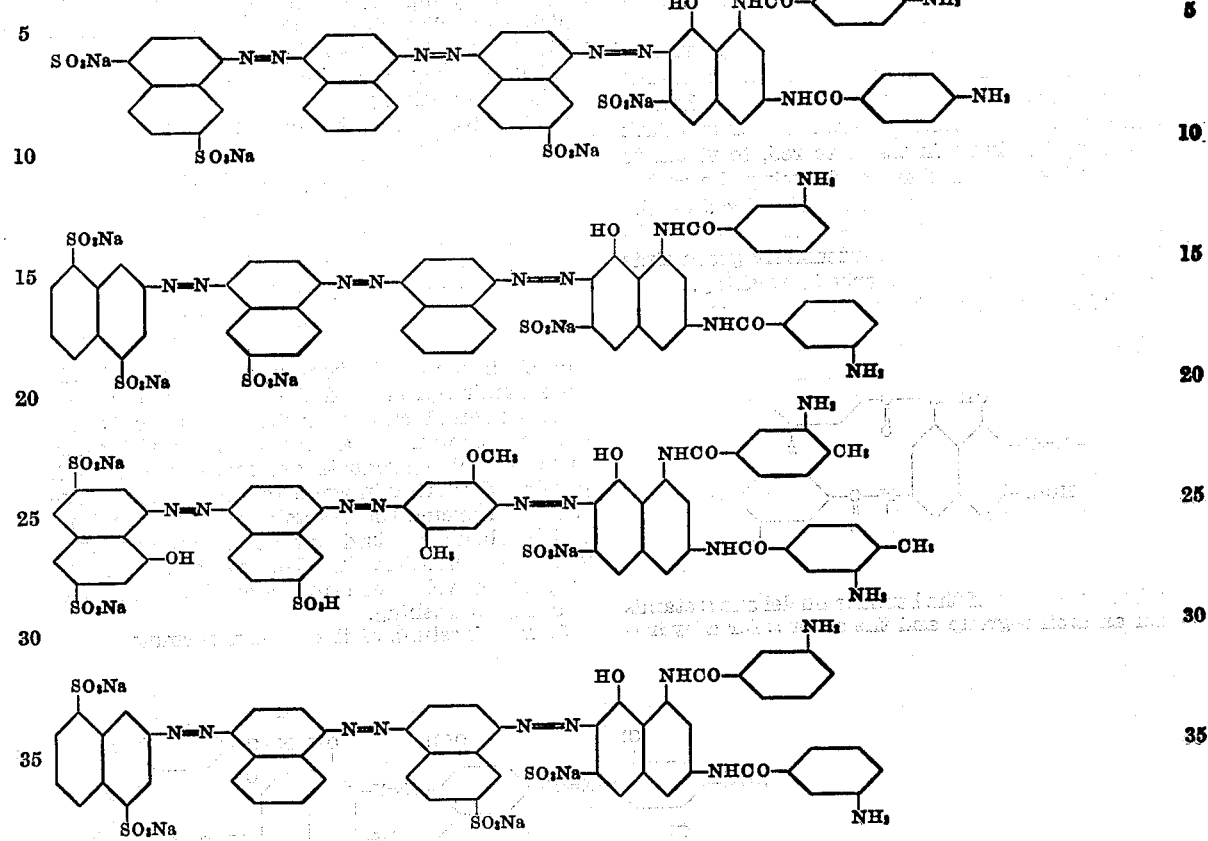

dye cotton blue tints which, when diazotized on the fiber and developed with 1-phenyl-3-methyl-5-pyrazolone, become green and fast.

What we claim is:—

1. The dyestuffs of the general formula

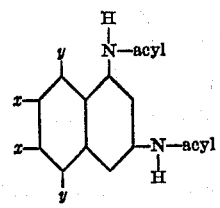

in which one $y$ stands for an OH-group and the other $y$ for a hydrogen atom, one $x$ stands for a SO₃H-group and the other $x$ for a —N=N—R-group wherein R means an aromatic radical selected from the group consisting of radicals of the benzene and naphthalene series and in which the —N=N—R-group stands in o-position to the OH-group, which products are more or less dark powders, dissolving in water to red, to violet, to blue and green solutions, and dyeing the fiber similar tints.

2. The dyestuffs of the general formula

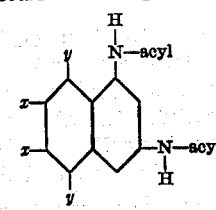

in which one $y$ stands for an OH-group and the other $y$ for a hydrogen atom, one $x$ stands for a SO₃H-group and the other $x$ for a —N=N—R-group wherein R means the radical of an aminoazo-dyestuff and in which the —N=N—R-group stands in o-position to the OH-group, which products are more or less dark powders, dissolving in water to violet, to blue and blue-green solutions, and dyeing the fiber similar tints.

3. The dyestuffs of the general formula

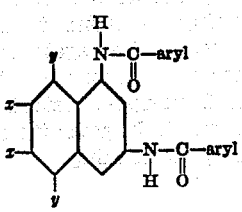

in which one $y$ stands for an OH-group and the other $y$ for a hydrogen atom, one $x$ stands for a SO₃H-group and the other $x$ for a —N=N—R-group wherein R means the radical of an aminoazo-dyestuff and in which the —N=N—R-group stands in o-position to the OH-group, and in which aryl stands for an aryl nucleus of the benzene series, which products are more or less dark powders, dissolving in water to violet, to blue and blue-green solutions, and dyeing the fiber similar tints.

4. The dyestuffs of the general formula

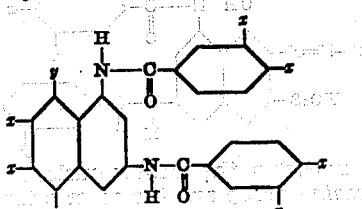

in which one $y$ stands for an OH-group and the other $y$ for a hydrogen atom, one $x$ stands for a SO₃H-group and the other $x$ for a —N=N—R-group wherein R means the radical of an aminoazo-dyestuff and in which the —N=N—R-group stands in o-position to the OH-group, and in which in each of the benzene nuclei one $x$ stands for an amino-group and the other $x$ for a hydrogen atom, which products are more or less dark powders, dissolving in water to red, to violet, to blue and green solutions, and dyeing the cotton fiber similar tints, which, when diazotized on the fiber and developed with 1-phenyl-3-methyl-5-pyrazolone, dye the same intensively green tints of good fastness, particularly to washing.

5. The dyestuffs of the general formula

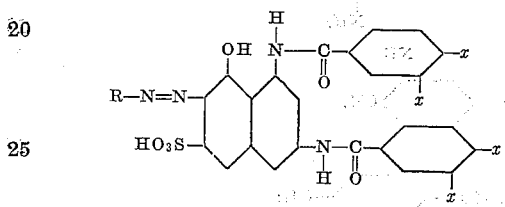

wherein in each of the benzene nuclei one $x$ stands for an amino-group and the other $x$ for a hydrogen atom, and R stands for the radical of an azo-dyestuff containing at least one naphthalene nucleus, which products are more or less dark powders dissolving in water to blue to green solutions and dyeing the vegetable fiber similar tints which, when diazotized on the fiber and developed with 1-phenyl-3-methyl-5-pyrazolone, dye the same intensively green tints of good fastness, particularly to washing.

6. The dyestuffs of the general formula

wherein in each of the benzene nuclei one $x$ stands for an amino-group and the other $x$ for a hydrogen atom, and R stands for the radical of a monoazo-dyestuff containing at least one naphthalene nucleus, which products are more or less dark powders dissolving in water to blue to green solutions and dyeing the vegetable fiber similar tints which, when diazotized on the fiber and developed with 1-phenyl-3-methyl-5-pyrazolone, dye the same intensively green tints of good fastness, particularly to washing.

7. The dyestuffs of the general formula

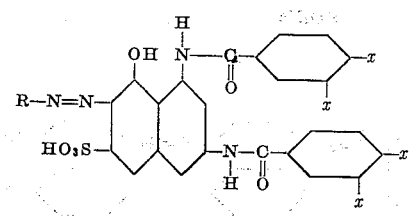

wherein in each of the benzene nuclei one $x$ stands for an amino-group and the other $x$ for a hydrogen atom, and R stands for the radical of a disazo-dyestuff containing at least one naphthalene nucleus, which products are more or less dark powders dissolving in water to blue to green solutions and dyeing the vegetable fiber similar tints which, when diazotized on the fiber and developed with 1-phenyl-3-methyl-5-pyrazolone, dye the same intensively green tints of good fastness, particularly to washing.

8. The dyestuffs of the general formula wherein in each of the benzene nuclei one $x$ stands for an amino-group and the other $x$ for a hydrogen atom, which products are more or less dark powders dissolving in water to blue solutions and dyeing the vegetable fiber similar tints which, when diazotized on the fiber and developed with 1-phenyl-3-methyl-5-pyrazolone, dye the same intensively green tints of good fastness, particularly to washing.

9. The dyestuffs of the general formula wherein in each of the benzene nuclei one $x$ stands for an amino-group and the other $x$ for a hydrogen atom, which products are more or less dark powders dissolving in water to blue solutions and dyeing the vegetable fiber similar tints which, when diazotized on the fiber and developed with 1-phenyl-3-methyl-5-pyrazolone, dye the same intensively green tints of good fastness, particularly to washing.

10. The dyestuffs of the general formula

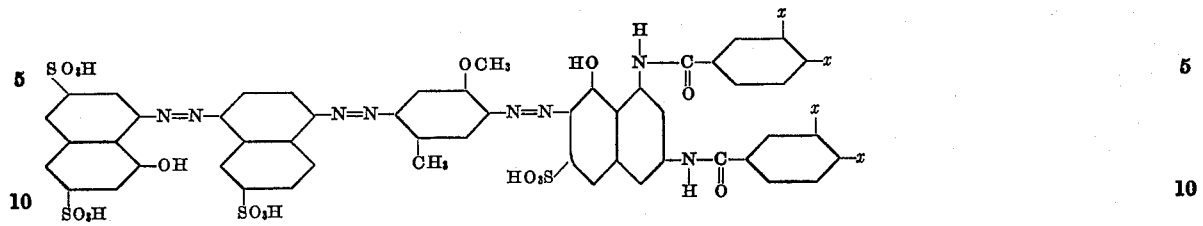

wherein in each of the benzene nuclei one $x$ stands for an amino-group and the other $x$ for a hydrogen atom, which products are more or less dark powders dissolving in water to blue solutions and dyeing the vegetable fiber similar tints which, when diazotized on the fiber and developed with 1-phenyl-3-methyl-5-pyrazolone, dye the same intensively green tints of good fastness, particularly to washing.

EMIL EDUARD MISSLIN.
RUDOLF von CAPELLER.